United States Patent [19]
Kristof et al.

[11] 3,763,951
[45] Oct. 9, 1973

[54] VEHICLE POWER STEERING SYSTEM
[75] Inventors: John J. Kristof; Geza A. Thiry, both of Marion, Ohio
[73] Assignee: Sycon Corporation, Marion, Ohio
[22] Filed: June 7, 1971
[21] Appl. No.: 150,433

[52] U.S. Cl................... 180/79.2 R, 137/625.69
[51] Int. Cl................................................ B62d 5/08
[58] Field of Search..................... 180/79.2 R; 137/625.69; 251/253, 256; 91/368, 382

[56] References Cited
UNITED STATES PATENTS

| | | | |
|---|---|---|---|
| 2,885,020 | 5/1959 | Herbenar | 180/79.2 R |
| 2,213,271 | 9/1940 | Davis | 180/79.2 R |
| 2,826,258 | 3/1958 | Livers | 180/79.2 R |
| 2,854,955 | 10/1958 | Be Vier | 91/382 X |

FOREIGN PATENTS OR APPLICATIONS

| | | | |
|---|---|---|---|
| 940,094 | 2/1956 | Germany | 180/79.2 R |
| 942,248 | 3/1956 | Germany | 180/79.2 R |

*Primary Examiner*—Leo Friaglia
*Assistant Examiner*—John A. Pekar
*Attorney*—Yount, Tarolli & Weinshenker

[57] ABSTRACT

A fluid operated power assisted steering system in which a control valve is positioned in the steering column with the valve including a mechanism for converting rotary movement of the column to axial shifting movement of a valve member which selectively interconnects a source of fluid pressure to opposite ends of a power cylinder connected to the steering mechanism. The valve is self-centering to facilitate wheel return upon completion of a turn.

11 Claims, 5 Drawing Figures

PATENTED OCT 9 1973 3,763,951

INVENTORS
JOHN J. KRISTOF
GEZA A. THIRY

BY Yount and Tarolli
ATTORNEYS

INVENTORS
JOHN J. KRISTOF
GEZA A. THIRY
BY Yount and Tarolli
ATTORNEYS

VEHICLE POWER STEERING SYSTEM

This invention relates to vehicle steering systems and, more particularly, to a fluid operated power assisted steering system and valve therefor.

There are disclosed in U.S. Pats. Nos. 2,964,119 and 3,199,414 power steering systems of the type with which this invention is concerned. As disclosed in those patents, a fluid operated power cylinder is used to provide power assist in the steering of the vehicle. Operation of the power cylinder is controlled by a valve which is associated with the drag link of the steering mechanism such that as the drag link is actuated to turn the wheels, the valve is actuated to admit fluid pressure to the power cylinder.

While this general arrangement has proven to be satisfactory, it is the principal object of this invention to provide a power steering system and valve therefor which is an improvement on the systems disclosed in the aforesaid patents.

More particularly, the use of a control valve in the drag link assembly of a vehicle, raises certain problems. For example, drag links for different vehicles vary in size and shape thereby rendering it somewhat difficult to provide a control valve which is adaptable for use in all types of vehicles. Moreover, the systems disclosed in the aforesaid patents require the drag link to be cut and the valve inserted and welded to the drag link. Because of the forces imposed on the steering mechanism, including the drag links, of an operational vehicle, it is thought to be desirable to avoid cutting that link and welding a valve to it.

To overcome problems such as these, this invention contemplates a power assisted steering system in which the control valve is positioned in the steering column. With this arrangement, cutting of the drag link is avoided and the forces imposed on the valve are substantially less than where the valve is inserted in the drag link. The valve includes an actuating mechanism which converts the rotational movement of the steering column to axial shifting movement of a valve member whereby the valve member is shifted longitudinally of the steering column in either direction, depending on the desired direction of turning movement of the vehicle, thereby to selectively communicate a source of fluid pressure to the power cylinder for assisting the steering of the vehicle. The valve is further designed to permit manual steering of the vehicle in the event of a power failure. The valve further includes means for returning the valve member and the steering wheel to a neutral or non-turning position upon termination of application of turning movement to the steering wheel by the operator.

A further, and more specific, feature of the valve is the use of a slidable valve sleeve which is rotatable relative to the valve actuating mechanism. This arrangement, together with the use of floating O-ring seals, effectively eliminates the imposition of undesirable drag on the steering wheel by the presence of the valve in the steering column.

Other objects, features and advantages of the invention will be more apparent upon a complete reading of the following description which, together with the attached drawings, discloses but a preferred form of the invention.

Referring now to the drawings wherein like reference numerals indicate like parts in the various views.

Figure 1:
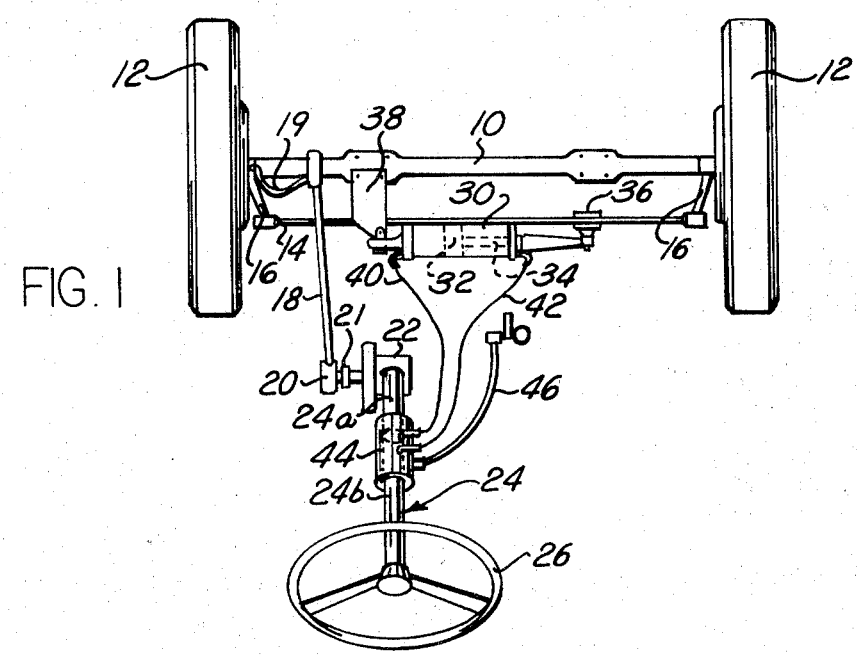
FIG. 1 is a schematic illustration of a typical application of the invention to the steering system of a vehicle.

Referring now more in detail to the drawings, there is illustrated in FIG. 1 a portion of a vehicle steering system which includes an axle 10 at opposite ends of which are carried wheels 12 supported in conventional manner. A transversely movable tie rod 14 is suitably connected at its ends to links 16. A drag link 18 is connected at one end to a link 19 and its other end to a pitman arm 20 carried on a shaft 21 extending from a conventional gear box 22. A steering column 24 extends at one end into the gear box 22 and at its other end supports a steering wheel 26.

The above described elements are typical of a conventional vehicle steering system and it is to be appreciated that the described steering mechanism is merely illustrative of the type of systems with which the principles of this invention may be utilized.

To provide power assist for the steering system, there is provided a power cylinder 30 which includes a piston 32 and piston rod 34. The outer extremity of the piston rod 34 is secured by an appropriate bracket 36 to the tie rod 14. The other end of the power cylinder 30 is supported by a bracket 38 on the front axle 10. Fluid pressure conduits 40, 42 extend from opposite ends of the cylinder 30 to a control valve, indicated generally by the reference number 44. Also connected to the control valve 44 is a further conduit 46 which connects the valve with a source of fluid pressure. It will be understood that when one of the conduits 40, 42 is communicated with fluid pressure, the fluid pressure acts to shift the piston 32 and rod 34 in one direction to turn the wheels 12 in one direction while fluid pressure through the other of the conduits shifts the piston and rod in the opposite direction to effect turning of the wheels in the opposite direction.

Figure 2:
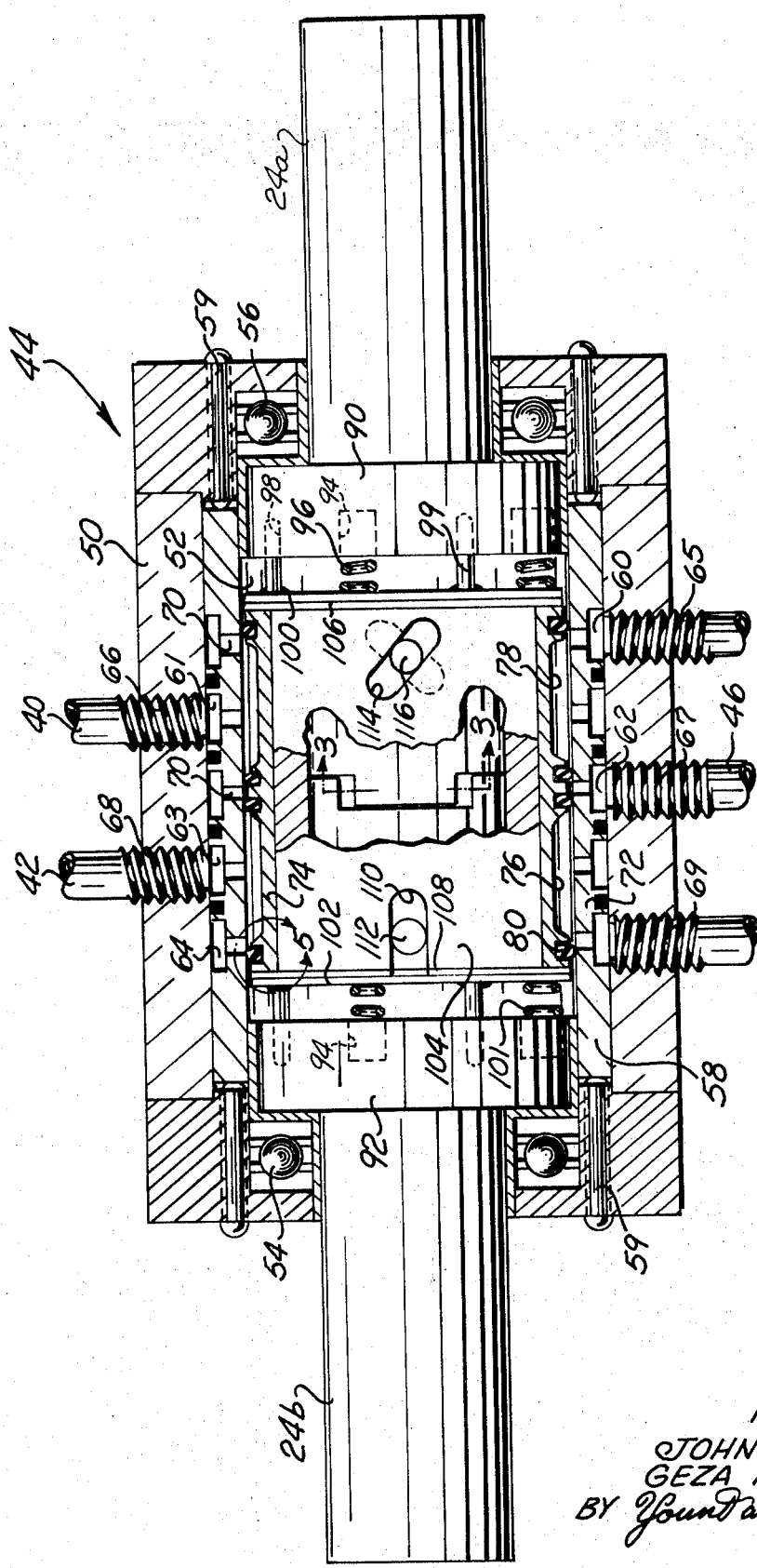
FIG. 2 is a longitudinal cross-sectional view of the control valve.

Referring now more in detail to the control valve 44, and with particular reference to FIG. 2, the valve comprises a valve housing 50 into one end of which extends one portion 24a of the steering column and into the other end of which extends another portion 24b of the steering column. The two portions 24a and 24b are coaxial with their inner ends extending into a central chamber 52 in the valve housing 50. A pair of thrust bearings 54, 56 rotatably support the shafts 24a, 24b in the housing 50.

Disposed in the central chamber 52 is a sleeve liner 58 having a plurality of circumferential grooves 60, 61, 62, 63, and 64 formed in the exterior surface thereof. Each of the grooves 60–64 is in fluid communication with a port formed in the housing 50. Thus, groove 60 communicates with exhaust port 65; the groove 61 communicates with feed port 66 which, in turn, is connected to conduit 40; groove 62 is connected to inlet port 67 which, in turn, is connected to conduit 46; groove 63 is connected to feed port 68 which is connected to conduit 42 and groove 64 is connected to exhaust port 69. Each of the grooves 60–64 is also in fluid communication with the central chamber 52 through radially extending openings 70 in the sleeve linear 58.

Suitable O-rings 72 sealingly separate each groove from the next adjacent groove. Centering pins 59 axially position the sleeve linear in the housing 50.

To control the flow of fluid between the inlet, feed and exhaust ports there is provided a valve member which comprises a shiftable valve piston 74. The valve piston 74 is in the form of a cylindrical sleeve which defines on its outer peripheral a pair of axially spaced circumferential shallow grooves 76, 78. O-rings 80 carried in O-ring grooves on the piston 74 cooperate with the interior surface of the sleeve linear 58 to sealingly separate the grooves 76, 78. It will be apparent from FIG. 2 that shifting movement of the piston 74 axially in one direction will communicate the inlet port 67 with the feed port 66 while isolating the feed port 66 from the exhaust port 65. Conversely, shifting the piston 74 in the opposite direction will communicate the inlet port 67 with the feed port 68 and isolate the feed port 68 from the exhaust port 69.

Figure 3:
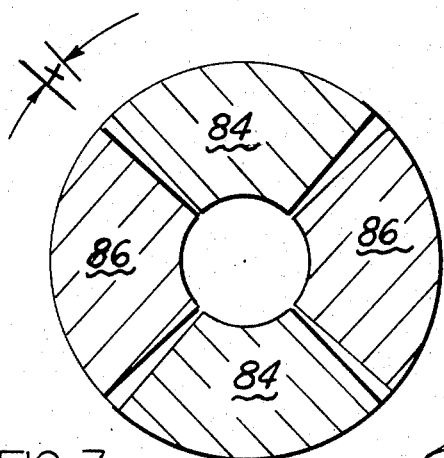
FIG. 3 is a sectional view along line 3—3 of FIG. 2.

To effect the shifting movement of the piston 74, a valve actuating mechanism is provided which is operative to convert the rotary motion of the steering column to rectilinear or axial shifting movement of the piston 74. This valve actuating mechanism is formed essentially in two parts, one part of which is associated with the end of shaft 24a and the other part of which is associated with the end of shaft 24b. The adjacent ends of the two shafts 24a, 24b are coupled together in the manner best viewed in FIGS. 3 and 4. Thus, the shaft 24a has at its end a pair of projecting lugs 84 which are adapted to mesh with a corresponding pair of lugs 86 on the end of shaft 24b. The circumferential extent of the meshing lugs is such that there is a small amount of relative rotation $x$ available between the two shafts. The magnitude of this relative rotation may, for example, be on the order of five degrees.

Figure 4:
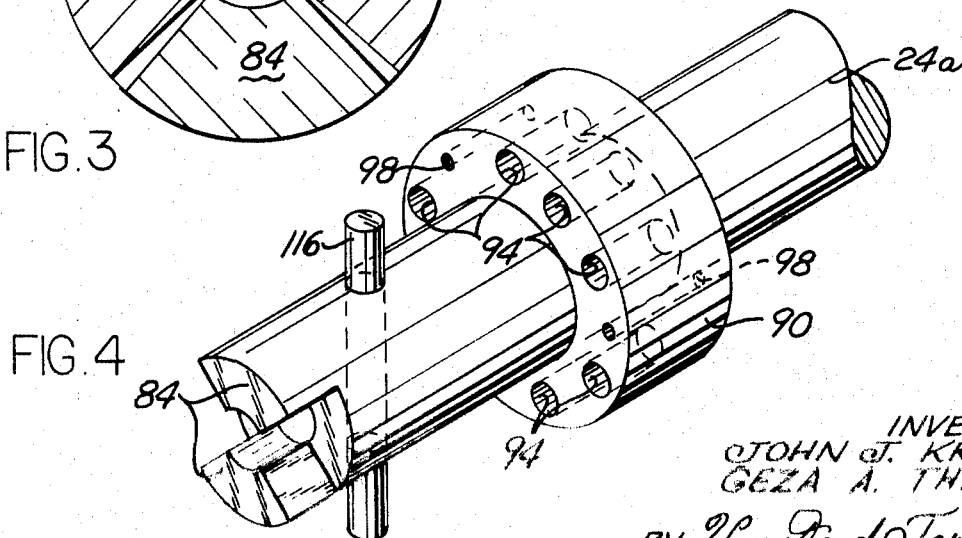
FIG. 4 is a perspective view of one portion of the valve actuator for the valve of FIG. 2.

Each of the shafts 24a, 24b further includes a radially extending flange 90, 92. The two flanges are identical in construction and, as shown in FIG. 4, have a plurality of circumferentially spaced axially extending openings formed in one axial end face thereof. One set of openings 94 is adapted to receive coil springs 96. The other openings 98 are adapted to receive axially projecting lugs 99 carried by a pressure plate 100 assembled over the inner end of the shaft 24a. The springs 96 in the openings 94 act against the adjacent face of the pressure plate 100. An identical arrangement of openings, springs 101 and pressure plate 102 is provided for the end of the shaft 24b.

Disposed between the two pressure plates 100, 102 is a cylindrical valve actuator or camming sleeve 104 which is telescopically received over the adjacent ends of the shafts 24a, 24b. The camming sleeve 104 has an outer diameter which permits it to be received internally of the piston 74 with radial flanges 106, 108 on either end of the sleeve 104 abutting the axial ends of the piston 74 to restrain axial movement of the piston relative to the camming sleeve. However, the piston 74 is free to rotate circumferentially of the camming sleeve 104.

A pair of axially extending slots 110 which are spaced apart by 180° are formed in one end of sleeve 104. A drive pin 112 carried by the shaft 24b extends through the shaft and into each of the slots. A second pair of slots 114 are formed in the opposite end of the camming sleeve 104. The ends of a cam pin 116 carried by the shaft 24a are received in these slots. As viewed in FIG. 2, the longitudinal axes of the slots 114 are angularly oriented relative to the longitudinal axis of the shaft 24a for a purpose to be hereinafter described.

The operation of the valve is as follows. As shown in FIG. 2, the valve is in a neutral position which corresponds to a condition in which the vehicle is proceeding along a straight path. It is to be noted that the piston 74 is centered relative to the inlet port 67 so that both the ports 66, 68 and the associated conduits 40, 42 are in communication with their respective exhaust ports 65, 69.

If it is now assumed that a right turn is to be made, the vehicle operator will turn the steering wheel 26 in that direction which, in turn, will impart a clockwise rotation as viewed in FIG. 1 to the steering column 24. Because of the lost motion connection between the coupling lugs 84, 86, initial rotational movement of the shaft 24b is independent of, and imparts no rotation to, shaft 24a. However, the pin 112, which is rigidly connected to the shaft 24b acts against the side of the slot 110 to rotate sleeve 104. Rotation of sleeve 104 causes the side wall of slot 114 to cam against stationary pin 116 thereby shifting sleeve 104 to the right, as viewed in FIG. 2. Since the piston 74 is engaged between the collars 106, 108 on the camming sleeve 104, shifting movement of the camming sleeve carries along with it a corresponding shifting movement of the piston 74. As the piston 74 moves to the right, the feed port 68 is first isolated from exhaust port 69 and then placed in communication with inlet port 67. The fluid pressure, normally air, admitted to the feed port 68 is transmitted by the conduit 42 to the power cylinder 30 to move the piston 32 and its associated piston rod 34 to the left, thereby causing the wheel 12 to turn to the right.

It will be appreciated that the lost motion connection between shafts 24a, 24b permits the power steering cylinder to become effective before actual manual steering is imparted to the steering mechanism. Thus, the inclination of the slots 114 is such that before the lugs 84, 86 physically engage, the piston 74 is shifted axially sufficiently to communicate fluid pressure to the power cylinder.

As the power cylinder is actuated and turning movement is imparted to the wheels by the cylinder, the shaft 24a is, in effect, driven by the cylinder 30 in a direction which tends to bring it back into rotational alignment with the shaft 24b. As the shaft 24a is rotated to "catch up" with the shaft 24b, it carries with it the pin 116 which reduces the camming action of the pin 116 in the slot 114, thereby enabling the springs 96 to move the sleeve 104 to the left, as viewed in FIG. 2. This return movement of the sleeve 104 carries along the piston 74 and has the effect of reducing the pressure admitted to the power cylinder 30 thus preventing the cylinder 30 from continuing to turn the wheels beyond the degree of turning established by the operator. However, if the operator continues to turn the steering wheel 26, thereby further rotating the shaft 24b, the sleeve 104 will again be cammed to the right and additional fluid pressure will be introduced to the power cylinder to further impart turning movement to the wheels. It will be appreciated that this sequence of operation in which the shaft 24b is rotated to introduce fluid pressure to the cylinder 30 and the shaft 24a is rotated by the turning movement of the wheels under the control of the power cylinder 30 continues until the operator stops turning the steering wheel 26. Upon release of the steering wheel, the springs 96 become effective to shift the camming sleeve 104 and, hence, the piston 74, back to a neutral position in which the feed port is isolated from the inlet port and connected to the exhaust port, thereby enabling the steering mechanism to return to a normal position in conventional manner.

It will be appreciated that in making a left turn, the valve functions in precisely the same manner except that fluid pressure is introduced to the conduit 40 by shifting of the piston 74 to the left, as viewed in FIG. 2.

Figure 5:
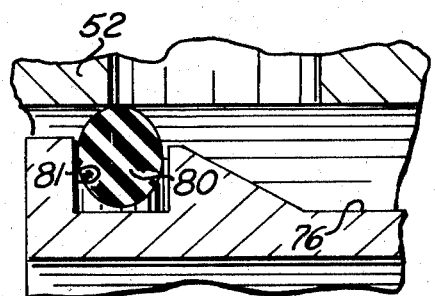
FIG. 5 is an enlarged fragmentary view of the encircled portion of FIG. 2.

It is to be noted that the rotary freedom of the piston 74 on the cam sleeve 104 avoids any restriction to the return of the wheel to a neutral position which might otherwise result from the engagement of the O-rings 80 with the inner surface of the linear sleeve 58. In addition, to avoid undue drag on the steering wheel, each of the O-rings 80 on the piston 74 is dimensioned such that it only lightly engages the inner surface of the sleeve 58 in the neutral position shown in FIG. 2. However, upon actuation of the valve, the air pressure introduced to one of the grooves 76, 78 cooperates with the O-rings to force the O-rings into sealing engagement with the piston and the sleeve. Thus, referring to FIG. 5, it will be observed that the O-ring 80 is loosely received in the O-ring groove 81 and is in light sliding engagement with the surface of the sleeve 58. Upon introduction of fluid pressure to the groove 76, the fluid pressure acts against the O-ring 80 to move it to the left, as viewed in FIG. 5, and in effect, distorts the O-ring to a generally eliptical cross sectional configuration in which the O-ring sealingly engages both the side wall of the groove 81 and the adjacent surface of the sleeve 52. In this manner, the O-rings provide an effective seal but impose no significant drag on the steering wheel as turning is being initiated and piston 74 is being shifted.

While the invention has been described with reference to a specific preferred embodiment, it is not intended that the illustrated embodiment or the terminology employed in describing it is to be limiting; rather, it is intended to be limited only by the scope of the appended claims.

Having thus described the invention, what is claimed is:

1. A power steering system for a vehicle having wheels, a steering wheel, a steering column, and linkage means interconnecting the steering column and the wheels for effecting turning movement of the wheels, said power steering system comprising a fluid operated motor means operable in a first direction from an initial condition to effect turning movement of the wheels in one direction and operable in a second direction from the initial condition to effect turning movement of the wheels in another direction, said steering column including a first shaft connected with the steering wheel, a second shaft connected with the linkage means, and lost motion coupling means for interconnecting said first and second shafts and for enabling a predetermined extent of relative rotation to occur between said shafts, housing means connected with said first and second shafts and defining a valve chamber, a valve actuator disposed in said valve chamber, said valve actuator having first and second spaced apart drive surfaces and first and second spaced apart cam surfaces, drive means connected with said first shaft and extending into the space between said first and second drive surfaces for rotating said valve actuator with said first shaft relative to said second shaft upon rotation of said first shaft relative to said second shaft in either one of two directions, cam means connected with said second shaft and extending into the space between said first and second cam surfaces for effecting axial movement of said valve actuator in one direction relative to said second shaft upon the occurrence of relative rotation in a first direction between said first and second shafts and for effecting axial movement of said valve actuator relative to said second shaft in a direction opposite to the one direction upon the occurrence of relative rotation between said first and second shafts in a second direction, valve means for porting fluid to said fluid motor means, said valve means being movable axially in the one direction from an initial position to port fluid to effect operation of said fluid motor in the first direction and being movable in the opposite direction from the initial position to port fluid to effect operation of said fluid motor in the second direction, and connector means interconnecting said valve means and said valve actuator for enabling said valve actuator to rotate relative to said valve means upon rotation of said valve actuator by said drive means, for moving said valve means in the one direction from the initial position upon movement of said valve actuator in the one direction under the influence of said cam means, and for moving said valve means in the opposite direction from the initial position upon movement of said valve actuator in the opposite direction under the influence of said cam means.

2. A power steering system as set forth in claim 1 wherein said housing means includes surface means for cooperating with said valve means to effect the porting of fluid to said fluid motor means, said valve means including seal means for sealingly engaging said surface means, said seal means being disposed in stationary sealing engagement with said surface means during rotation of said valve actuator by said drive means in the absence of movement of said valve actuator under the influence of said cam means, said seal means being movable relative to said surface means in said one direction upon movement of said valve actuator in said one direction and being movable relative to said surface means in said opposite direction upon movement of said valve actuator in said opposite direction.

3. A power steering system as set forth in claim 2 wherein said valve means includes means for defining a cylindrical inner surface, said valve actuator including means for defining a cylindrical outer surface disposed in abutting engagement with cylindrical inner surface, said cylindrical inner surface being rotatable relative to said cylindrical outer surface upon rotation of said valve actuator by said drive means.

4. A power steering system as set forth in claim 2 wherein said seal means includes an annular seal ring which is disposed in sealing engagement with said surface means.

5. A power steering system as set forth in claim 1 further including biasing means for urging said valve means toward the initial position.

6. A power steering system as set forth in claim 5 wherein said biasing means is effective to bias said shafts to a centered position where said lost motion coupling means is effective to permit rotation of either of said shafts in either one of two directions.

7. A power steering system as set forth in claim 1 wherein said valve means and valve actuator are disposed in a telescopic relationship with each other and with said lost motion coupling means.

8. A power steering system for a vehicle having wheels, a steering wheel, a steering column, and linkage means interconnecting the steering column and the wheels for effecting turning movement of the wheels, said power steering system comprising a fluid operated motor means operable in a first direction from an initial condition to effect turning movement of the wheels in one direction and operable in a second direction from the initial condition to effect turning movement of the wheels in another direction, said steering wheel, a second shaft connected with the linkage means, and lost motion coupling means for interconnecting said first and second shafts and for enabling a predetermined extent of relative rotation to occur between said shafts, housing means connected with said first and second shafts and defining a valve chamber in which said lost motion coupling means is disposed, a valve actuator disposed in said valve chamber and circumscribing said lost motion coupling means, said valve actuator having first and second spaced apart drive surfaces extending parallel to a longitudinal axis of said first shaft and first and second spaced apart cam surfaces extending transversely to a longitudinal axis of said second shaft, drive means connected with said first shaft and extending into the space between said first and second drive surfaces for rotating said valve actuator with said first shaft relative to said second shaft upon rotation of said first shaft relative to said second shaft in either one of two directions, cam means connected with said second shaft and extending into the space between said first and second cam surfaces for effecting axial movement of said valve actuator in one direction relative to said second shaft upon the occurrence of relative rotation in a first direction between said first and second shafts and for effecting axial movement of said valve actuator relative to said second shaft in a direction opposite to the one direction upon the occurrence of relative rotation between said first and second shafts in a second direction, and valve means connected with said valve actuator and disposed in a circumscribing relationship with both said lost motion coupling means and said valve actuator, said valve means including means for porting fluid to effect operation of said fluid motor means in the first direction in response to movement of said valve actuator in the one direction relative to the second shaft and for porting fluid to effect operation of said fluid motor means in the second direction in response to movement of said valve actuator relative to said second shaft in the direction opposite to the one direction.

9. A power steering system as set forth in claim 8 further including connector means interconnecting said valve means and said valve actuator for enabling said valve actuator to rotate relative to said valve means upon rotation of said valve actuator by said drive means.

10. A power steering system as set forth in claim 9 wherein said housing means including surface means for cooperating with said valve means, said valve means including surface means defining a plurality of annular grooves and a plurality of O-ring seals each of which is disposed in an associated one of said annular grooves, said O-ring seals having a dimension such that each seal is loosely received in its associated groove and engages said surface means.

11. A power steering system as set forth in claim 10 further including connector means interconnecting said valve means and said valve actuator for enabling said O-ring seals to remain in stationary sealing engagement with said surface means during rotation of said valve actuator by said drive means in the absence of movement of said valve means under the influence of said cam means.

* * * * *